(12) United States Patent
Ding et al.

(10) Patent No.: US 8,423,338 B2
(45) Date of Patent: Apr. 16, 2013

(54) PETROLEUM RESERVOIR HISTORY MATCHING METHOD USING LOCAL PARAMETRIZATIONS

(75) Inventors: Didier Ding, Le Pecq (FR); Frédéric Roggero, Rueil-Malmaison (FR)

(73) Assignee: IFP, Cedex (FR)

( * ) Notice: Subject to any disclaimer, the term of this patent is extended or adjusted under 35 U.S.C. 154(b) by 617 days.

(21) Appl. No.: 12/542,943

(22) Filed: Aug. 18, 2009

(65) Prior Publication Data

US 2011/0010142 A1    Jan. 13, 2011

(30) Foreign Application Priority Data

Aug. 19, 2008   (FR) .................................... 08 04640

(51) Int. Cl.
*G06G 7/48* (2006.01)
(52) U.S. Cl.
USPC ........................................................ 703/10
(58) Field of Classification Search .................. 703/2, 6, 703/9, 10
See application file for complete search history.

(56) References Cited

U.S. PATENT DOCUMENTS

| | | | |
|---|---|---|---|
| 7,392,166 B2 | 6/2008 | Le Ravalec-Dupin et al. | |
| 2004/0138862 A1 | 7/2004 | Hu et al. | |
| 2005/0010383 A1* | 1/2005 | Le Ravalec-Dupin et al. | 703/10 |
| 2006/0058965 A1* | 3/2006 | Ricard et al. | 702/14 |
| 2007/0118346 A1 | 5/2007 | Wen et al. | |

FOREIGN PATENT DOCUMENTS

FR    2 851 670    8/2004

OTHER PUBLICATIONS

V. Gervais et al., History Matching Using Local Gradual Deformation, SPE, Jun. 11, 2007, 12 pages.*
Hu, Gradual Deformation and Iterative Calibration of Gaussian-Related Stochastic Models, Mathematical Grology, vol. 32, No. 1, 2000, 22 pages.*
Hu, L.Y. and M. Le Ravelec-Dupin: "Elements for an Integrated Geostatistical Modeling of Heterogeneous Reservoirs", Oil & Gas Science and Technology, vol. 59, No. 2, 2004, pp. 141-155, XP002520429.
Hu, Lin Y.: "Gradual Deformation and Iterative Calibration of Gaussian-Related Stochastic Models", Jan. 1, 2000, Mathematical Geology, Plenum Press, London, GB, pp. 87-108, XP008021541, ISSN: 0882-8121.
F. Roggero, et al., "Gradual Deformation of Continuous Geostatistical Models for History Matching", Society of Petroleum Engineers, SPE 49004, 1998, 16 pages.

(Continued)

*Primary Examiner* — Kamini S Shah
*Assistant Examiner* — Luke Osborne
(74) *Attorney, Agent, or Firm* — Antonelli, Terry, Stout & Kraus, LLP.

(57) ABSTRACT

The invention is a method of constructing an image of a petroleum reservoir from dynamic data having application for petroleum reservoir characterization. At least two independent realizations of the reservoir are generated from at least two Gaussian white noises. At least one region is defined within the reservoir and a parameter allowing the shape and the size of this region to be modified is defined. A new realization of the reservoir is then generated from a linear combination of the white noises. The coefficients of this linear combination depend on the parameter allowing the region to be modified. A local objective function measuring, within this region, a difference between dynamic data simulated from the new realization and the measured dynamic data is then calculated. Finally, the image of the reservoir is constructed by iteratively modifying the parameter so as to minimize the local objective function.

15 Claims, 9 Drawing Sheets

OTHER PUBLICATIONS

Mickaële Le Ravalec, et al., "The FFT Moving Average (FFT-MA) Generator: An Efficient Numerical Method for Generating and Conditioning Gaussian Simulations", Mathematical Geology, vol. 32, No. 6, 2000, pp. 701-723.

Leonardo Costa Reis, Doctorial Thesis, "Integration Des Donnees Dynamiques Dans Un Modele Geostatistique De Reservoir", Presentation at LTJniversitë Pierre et Marie Curie (Paris VI), 2001, 3 pages.

* cited by examiner

PETROLEUM RESERVOIR HISTORY MATCHING METHOD USING LOCAL PARAMETRIZATIONS

BACKGROUND OF THE INVENTION

1. Field of the Invention

The present invention relates to petroleum reservoir characterization through geological modelling. More particularly, the invention relates to a history matching method through gradual modification of an image representative of the petroleum reservoir, for considering seismic data and dynamic data such as oil production, water production, gas/oil ratio (GOR), water cut, seismic impedances, etc.

2. Description of the Prior Art

Optimization and development of petroleum reservoirs are based on the most accurate possible description of the structure and of the petrophysical properties of the reservoir being studied. a tool implemented on a computer is used for accounting for these two aspects in an approximate way known as a geological model. A geological model is intended to best account for the structure and the petrophysical properties of a reservoir. The geological model has a grid pattern that forms the frame of the reservoir and that has to be representative of the structure and three- or two-dimensional petrophysical property maps (or images) associated with this grid, that have to be representative of the static or dynamic behavior of the reservoir.

In the petroleum industry, it is very important to characterize reservoirs using dynamic data such as the production data or 4D seismic data. Geostatistical methods are often used to construct a reservoir heterogeneity map. In this context, the maps are referred to as "geostatistical realizations". They are generated on a random basis by a computer and do not generally allow the production and/or seismic data to be calibrated. To constrain these maps (realizations) by the measured data, it is necessary to parametrize the maps in order to subsequently apply an optimization method to minimize a calibration criterion representing the differences between simulation results and measurements. Parametrizing an image or a realization within the context of geostatistical methods defines a parameter whose modification allows a new image to be obtained. A parameter is thus generally associated with an image construction or deformation method based on this parameter.

Several methods have been proposed to parametrize geostatistical realizations. The gradual deformation method presented by Roggero, F. and Hu, L. Y.: "Gradual Deformation of Continuous Geostatistical Models for History Matching", paper SPE-49004, Proc. SPE Annual Technical Conference and Exhibition, New Orleans, 1998, introduces a parameter that allows combining two geostatistical realizations to generate a new realization that varies from one existing realization to the next, while keeping geostatistical coherence. This method is a global approach that does not account for the objective function variations in local regions.

To improve this approach, the local gradual deformation method presented by Hu, L. Y.: "Gradual Deformation and Iterative Calibration of Gaussian-Related Stochastic Models", Mathematical Geology, Vol. 32, No. 1, 2000, allows combining two geostatistical realizations in predetermined local regions. The regions are defined by stratigraphic grid cells. The geometrical domains of these local regions do not change during an optimization process.

Another method for accounting for local impacts, referred to as the "patchwork method", is proposed by COSTA REIS, L.: "Intégration des Données Dynamiques Dans un Modéle Géostatistique de Reservoir", Ph.D., Université Paris 6, 2001. According to this approach, several realizations are generated. Dynamic data are simulated thereafter by means of a computer based reservoir simulator. A new realization is then generated by combining existing realizations on the stratigraphic grid cells, according to the objective function values in local regions. The absence of parametrization of this approach does however not allow applying an optimization method to facilitate history matching.

SUMMARY OF THE INVENTION

The invention provides an alternative method for constructing or locally modifying the image of a petroleum reservoir in such a way that the image of the reservoir is coherent with dynamic data measured in the field. The method is based on a local parametrization of reservoir images obtained from computer based geostatistical modelling, while accounting for calibration criteria for local regions (well and/or seismic region).

The invention relates to a method of constructing an image of a petroleum reservoir, from dynamic data measured within the reservoir. It comprises the following:

a) generating at least two independent realizations of the reservoir from at least two Gaussian white noises, b) defining at least one region within the reservoir and defining a parameter allowing the region to be modified;

c) generating a new realization of the reservoir from a linear combination of the Gaussian white noises whose linear combination coefficients depend on the parameter allowing the region to be modified;

d) calculating a local objective function measuring, within the region, a difference between dynamic data simulated from the new realization and the measured dynamic data; and e) constructing the image of the reservoir by modifying the parameter so as to minimize the local objective function and by repeating c).

According to the invention, the parameter can allow modification of the size and the shape of the region. The region can be of radial type, the parameter being then the radius of this region. The region can also be of elliptical type.

According to an embodiment, several regions are defined within the reservoir and a parameter allowing the regions to be modified is then defined for each region; and a) a new realization of the reservoir is generated from a linear combination of Gaussian white noises whose linear combination coefficients depend on the parameters defined for each region;

b) a local objective function measuring, within each region, a difference between dynamic data simulated from the new realization and the measured dynamic data is calculated for each region; and c) the image of the reservoir is constructed by modifying at least one of the parameters so as to minimize the sum of the local objective functions and by repeating a).

According to this embodiment, at least one of the regions can be of radial and/or elliptical type.

According to the invention, the linear combination of Gaussian white noises can be written as follows:

$$B_0(X) = \sum_{i=1}^{NR} \alpha_i B_i(X)$$

with:

X being a grid cell discretizing the reservoir;

$B_0$ being a Gaussian white noise from the linear combination, allowing the new realization to be generated;

$B_i$ being a Gaussian white noise allowing one of the independent realizations to be generated;

NR being a number of Gaussian white noises to be combined;

$\alpha_i$ being a coefficient of the linear combination, defined by:

$$\alpha_i = \frac{vol(X \cap R_i)}{\sqrt{\sum_{j=1}^{NR} vol^2(X \cap R_j)}}$$

with:

vol(V) being the volume of a domain V, defined from the parameter allowing region R to be modified;

$R_i$, $R_j$ is a region.

Finally, according to the invention, a region can correspond to a zone around a well drilled through the reservoir, a zone between two wells drilled through the reservoir or a zone having homogeneous characteristics identified on seismic data.

BRIEF DESCRIPTION OF THE DRAWINGS

Other features and advantages of the method according to the invention will be clear from reading the description hereafter of embodiments given by way of non limitative example, with reference to the accompanying figures wherein.

DETAILED DESCRIPTION

The invention is described within the context of history matching. It mainly comprises four stages:

1—Generation of at least two images of the reservoir
2—Definition of regions within the images and parametrization of these regions
3—Definition of an objective function
4—Optimization of the images of the reservoir.
1—Generation of at Least Two Images of the Reservoir Images of the reservoir heterogeneities are generated on a stratigraphic grid by means of computer based geostatistical methods. One of these geostatistical methods first generates a Gaussian white noise on a stratigraphic grid, then converts the white noise to a geostatistical realization, by accounting for the geological structure. Such a method is for example described in M. Leravalec, B. Noetinger and L. Hu "The FFT Moving Average (FFT-MA) Generator: An Efficient Tool for Generating and Conditioning Gaussian Simulations", Mathematical Geology, Vol. 32, No. 6, 2000.

Let B be a Gaussian white noise generated on the stratigraphic grid, H be the conversion of the white noise to a geostatistical realization, and Z be the geostatistical realization. Their relation is then denoted by the following formula:

$Z=H(B)$

These images represent a map of the physical properties of the reservoir: permeability, porosity, . . . .

2—Definition of Regions within the Images and Parametrization of these Regions

Regions having any geometry and that are not defined by grid cells are defined within these images. They can be represented for example, in two dimensions, by circular zones centred on the wells running across the reservoir. They can also be different zones having homogeneous characteristics identified on seismic data.

These regions are then parametrized, that is a parameter is defined allowing the shape of these regions to be modified. According to the invention, this parametrization allows variation of the sizes and the shapes of the regions in the optimization process. This approach allows minimizing more efficiently the objective function for history matching and thus to better characterize the reservoir using the measured data.

There are several methods for introducing parameters in order to continuously change the sizes and the shapes of the domains.

The region parametrization technique is illustrated from two-dimensional examples, in particular for two types of region: radial and elliptical. The parametrization method is readily generalized to general cases.

Radial Region

Figure 2:
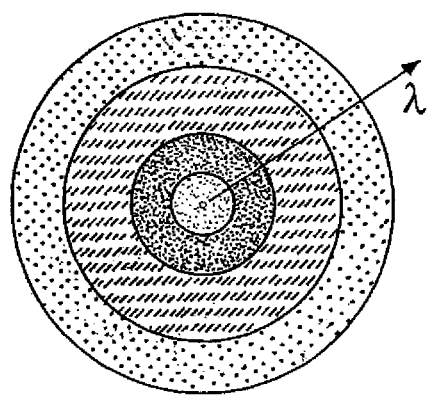
FIG. 2 shows the change in size of a radial region as a function of radius (parameter) $\lambda$.

A radial type region is particularly interesting for calibration on well data. The edge of a radial domain $C_\lambda$ around point $(x_0, y_0)$ can be written by the equation:

$(x-x_0)^2+(y-y_0)^2=\lambda^2$ where $\lambda$ is a parameter corresponding to the radius of the domain. The result of a change in value $\lambda$ is a variation in the size of the domain (FIG. 2). For $\lambda=0$, the domain is reduced to one point.

Elliptical Region

Using an elliptical region is interesting for calibration between an injector well and a producer well, or for a well in an anisotropic medium.

If the injector well is at point $(x_1, y_1)$ and the producer well at point $(x_2, y_2)$, the edge of an elliptical region between these two points $E_\lambda$ can be described by (FIG. 4):

$$\sqrt{(x-x_1)^2+(y-y_1)^2}+\sqrt{(x-x_2)^2+(y-y_2)^2}=\lambda^2+\sqrt{(x_1-x_2)^2+(y_1-y_2)^2}$$

where $\lambda$ is a parameter.

Figure 4:
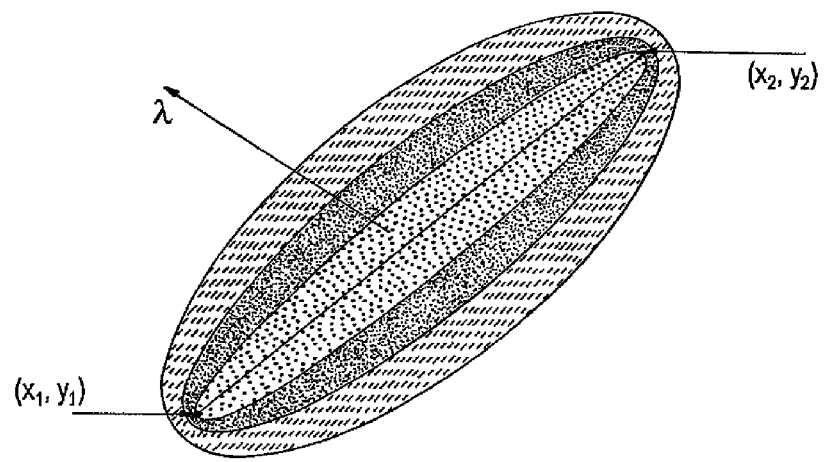
FIG. 4 shows elliptical domains whose size and shape change as a function of parameter $\lambda$.

For $\lambda=0$, the domain is reduced to a line connecting the two points $(x_1, y_1)$ and $(x_2, y_2)$. FIG. 4 shows elliptical domains whose size and shape change as a function of parameter $\lambda$.

Associated with the definition of this parameter $\lambda$, we provide a technique is provided for constructing a new realization, referred to as "mixed realization", from two known realizations on any domains.

Let $Z_1$ and $Z_2$ be two geostatistical realizations (images of the reservoir) that are generated from Gaussian white noises $B_1$ and $B_2$ on reservoir R by a computer, that is:

$$Z_1 = H(B_1)$$

and $$Z_2 = H(B_2)$$

Figure 1:
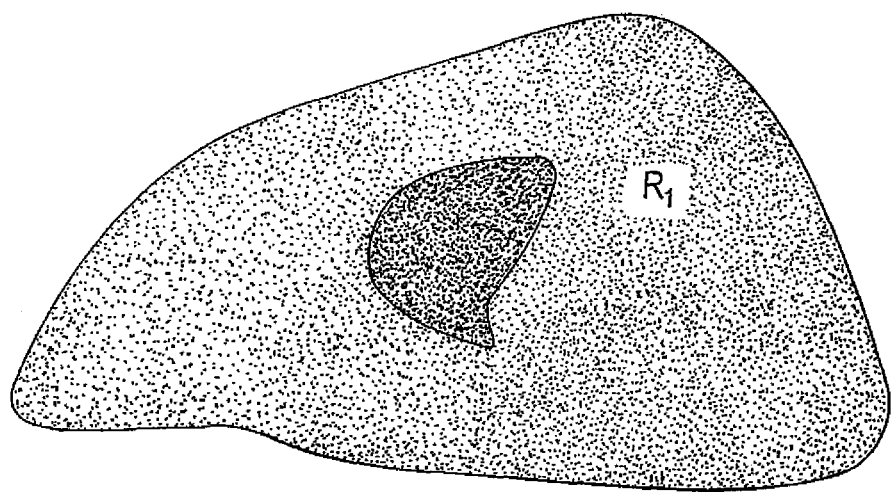
FIG. 1 shows a reservoir split into two regions $R_1$ and $R_2$ of any shape.

If reservoir R is split into two parts $R_1$ and $R_2$ of any geometry, with $R_1 \cup R_2 = R$ (FIG. 1), then a new Gaussian white noise $B_0$ is constructed by spatially mixing noises $B_1$ and $B_2$. In the petroleum context, the geostatistical realization and the Gaussian white noise are generated on a stratigraphic grid. The new Gaussian white noise $B_0$ can be constructed on a grid cell X by means of the following relation:

$$B_0(X) = \alpha_1 B_1(X) + \alpha_2 B_2(X)$$

where:

$$\alpha_i = \frac{vol(X \cap R_i)}{\sqrt{vol^2(X \cap R_1) + vol^2(X \cap R_2)}}$$

(i=1, 2) with vol(V) representing the volume of a domain V. The coefficients satisfy $\alpha_1^2 + \alpha_2^2 = 1$.

Volume V is directly linked with parameter $\lambda$, allowing the sizes and the shapes of the regions to be continuously changed.

This linear combination guarantees that the distribution of $B_0$ verifies a standard normal distribution. $B_0$ can thus be considered to be a Gaussian white noise on the stratigraphic grid. This new Gaussian white noise is formally denoted by:

$$B_0 = B_1(R_1) + B_2(R_2)$$

A new realization can then be constructed by:

$$Z_0 = H(B_0)$$

This realization is a mixed realization combining $B_1$ and $B_2$ in domains $R_1$ and $R_2$ of any geometry. The new geostatistical realization is formally denoted by:

$$Z_0 = Z_1(R_1) + Z_2(R_2)$$

Thus, by using the parametrization of the regions:
Radial Region

Figure 3:
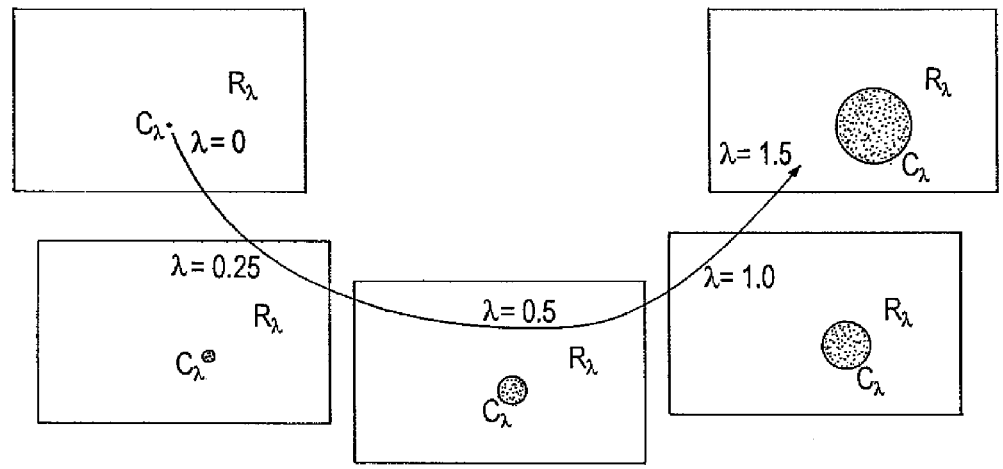
FIG. 3 illustrates the variation of the geostatistical realizations as a function of the size of the radial domain (parameter $\lambda$.

Let $Z_1$ and $Z_2$ be two geostatistical realizations of reservoir R, $R_\lambda = R - C_\lambda$ the complement of $C_\lambda$ in R, then the mixed realization $Z(\lambda) = Z_1(R_\lambda) + Z_2(C_\lambda)$ varies as a function of $\lambda$. In particular, we have $Z(0) = Z_1$. Therefore, new geostatistical realizations can be generated by continually deforming the domains around a point in space, as illustrated by FIG. 3.

Elliptical Region

Let $R_\lambda = R - E_\lambda$ be the complement of $E_\lambda$ in R, then mixed realization $Z(\lambda) = Z_1(R_\lambda) + Z_2(E_\lambda)$ varies as a function of $\lambda$. Again, we have $Z(0) = Z_1$.

It is possible to generalize the construction of the mixed realization from several known realizations on any domain.

Let $R_i$ (i=1, ..., NR) be a decomposition of R with $$R = \bigcup_{i=1}^{NR} R_i,$$

$Z_j$(j 1 ... NG), the NG independent geostatistical realizations that are generated with the Gaussian white noises $B_j$ (j= 1, ..., NG), then, on a grid cell X, a new Gaussian white noise $B_0$ is constructed by means of the following relation:

$$B_0(X) = \sum_{i=1}^{NR} \alpha_i B_{J(i)}(X)$$

where J(i), an integer between 1 and NG, corresponds to the number of the white noise in domain $$\alpha_i = \frac{vol(X \cap R_i)}{\sqrt{\sum_{j=1}^{NR} vol^2(X \cap R_j)}}$$

with $$\sum_{i=1}^{NR} \alpha_i^2 = 1.$$

A mixed realization is thus constructed by: $Z_0 = H(B_0)$. This formula is symbolically denoted by:

$$B_0 = \sum_{i=1}^{NR} B_{J(i)}(R_i)$$

and the new geostatistical realization by:

$$Z_0 = \sum_{i=1}^{NR} Z_{J(i)}(R_i).$$

Domains $R_i$ can be parametrized. If domain $R_i$ is parametrized by parameter $\lambda_i$ ($\lambda_i$ can be a scalar or a vector), this domain thus parametrized is denoted by $R_{\lambda_i}$. Realization $$Z(\lambda_1, \ldots, \lambda_{NR}) = \sum_{i=1}^{NR} Z_{J(i)}(R_{\lambda_i})$$

varies gradually as a function of parameters $\lambda_1, \ldots, \lambda_{NR}$.

3—Definition of an Objective Function

Flow simulations are carried out from the images of the reservoir that represent, for example, the permeabilities within the reservoir. An objective function is then used to calculate the differences between these simulated data and measured data. The goal is to select the best geostatistical realization that minimizes the objective function.

A global objective function F that can be decomposed as follows is defined:

$$F = \sum_{i=1}^{N} F_i$$

where $F_i \geq 0$ is a local objective function that estimates the simulation quality for one or more wells or seismic attributes in a region i. These local objective functions allow the impact of a realization in a region of reservoir R to be quantified.

4—Optimization of the Images of the Reservoir

The goal is to select the best geostatistical realization that minimizes objective function F. However, if $Z_1$ and $Z_2$ are two geostatistical realizations having $F(Z_2) \leq F(Z_1)$ as the global objective function, it is possible to have for some local objective functions $F_i$: $F_i(Z_2) > F_i(Z_1)$. Without loss of generality, it is assumed that $F_i(Z_2) > F_i(Z_1)$ for $i=1, \ldots, N_2$ ($N_2 < N$).

The global objective function is then minimized by a computer constructing a mixed realization on identified regions, by optimizing the sizes and the shapes of these regions.

For each region of influence $R_i$ ($i=1, \ldots, N_2$), there is a parameter $\lambda_i$ (scalar or vector) and a local objective function $F_i$. Let $R_{\lambda,i}$ ($i=N_2$) be the regions thus parametrized by $\lambda_i$ and $$R_c = R - \bigcup_{i=1}^{N_2} R_{\lambda i}$$

the complementary region to $$\bigcup_{i=1}^{N_2} R_{\lambda i}$$

in reservoir R, a new parametrized geostatistical realization is then constructed by the relation:

$$Z(\lambda_1, \ldots, \lambda_{N_2}) = \sum_{i=1}^{N_2} Z_1(R_{\lambda i}) + Z_2(R_c)$$

Figure 5:
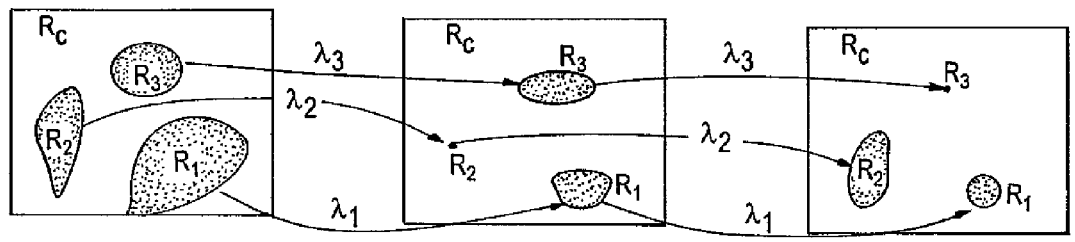
FIG. 5 illustrates the variation of the geostatistical realizations as a function of the parameters that define the domains.

This realization accounts for the local regions of realization $Z_2$ for minimizing local objective function $F_i$ ($i=1, \ldots, N_2$). If all the regions $R_{\lambda,i}$ ($i=1, \ldots, N_2$) are reduced to a point or a line, realization $Z_2$ is obtained again. The variation of parameter $\lambda$ changes geostatistical realization $Z(\lambda_1, \ldots, \lambda_{N_2})$, as illustrated by FIG. 5.

This approach allows minimizing more efficiently the objective function for history matching and thus to better characterize the reservoir using the measured data.

Application Example

Let there be a reservoir whose size is 2500 m in the x direction, 2500 m in the y direction and 50 m in the z direction. The initial pressure of the reservoir is 250 bars. The wells are operated at an imposed pressure with 320 bars at the injector well and 180 bars at the producer wells. A 3000-day record is available. The measured production data are: oil flow rates at the four producer wells, water flow rate at the injector well and water cuts at the four producer wells.

The global objective function that measures the differences between the simulated data and the measured data is defined as follows:

$$F = \frac{1}{2}\left(\sum_{i=1}^{N_{prod}} \omega_{o,i} \frac{1}{N_{time}} \sum_{k=1}^{N_{time}} \left(\frac{Q_{o,i,k}^{obs} - Q_{o,i,k}^{sim}}{\sigma_o(i)}\right)^2 + \right.$$

$$\sum_{i=1}^{N_{prod}} \omega_{fw,i} \frac{1}{N_{time}} \sum_{k=1}^{N_{time}} \left(\frac{FW_{i,k}^{obs} - FW_{i,k}^{sim}}{\sigma_{fw}(i)}\right)^2 +$$

$$\left. \sum_{i=1}^{N_{inj}} \omega_{w,i} \frac{1}{N_{time}} \sum_{k=1}^{N_{time}} \left(\frac{Q_{w,i,k}^{obs} - Q_{w,i,k}^{sim}(\theta)}{\sigma_w(i)}\right)^2 \right)$$

where $N_{prod}$ is the number of producer wells,
$N_{inj}$ is the number of injector wells,
$N_{time}$ is the number of points measured,
$\sigma$ is the confidence interval, $\sigma_o$ is the confidence interval for the oil flow rate, $\sigma_w$ is the confidence interval for the water flow rate and $\sigma_{fw}$ is the confidence interval for the water cut,
$\omega$ is the weight, $\omega_o$ is the weight for the oil flow rate, $\omega_w$ is the weight for the water flow rate and $\omega_{fw}$ is the weight for the water cut,
$Q_o$ is the oil flow rate at the producer wells,
$Q_w$ is the water flow rate at the injector well,
FW is the water cut,
superscript obs means observation,
superscript sim means simulation.

In the example considered, we have:
$N_{prod}=4$,
$N_{inj}=1$,
$N_{time}=30$, because a measurement is performed every 100 days up to 3000 days,
$\sigma_o=20$,
$\sigma_w=50$,
$\sigma_{fw}=0.05$,
$\omega_o=1$,
$\omega_w=1$,
$\omega_{fw}=1$.

This objective function is decomposed into five local objective functions linked with the four producer wells and the injector well:

$$F = \sum_{i=1}^{5} F_i$$

with:

$$F_1 = \frac{1}{2}\frac{1}{N_{time}} \sum_{k=1}^{N_{time}} \left(\left(\frac{Q_{o,1,k}^{obs} - Q_{o,1,k}^{sim}}{\sigma_o(i)}\right)^2 + \left(\frac{FW_{o,1,k}^{obs} - FW_{o,1,k}^{sim}}{\sigma_{fw}(i)}\right)^2\right)$$

$$F_2 = \frac{1}{2}\frac{1}{N_{time}} \sum_{k=1}^{N_{time}} \left(\left(\frac{Q_{o,2,k}^{obs} - Q_{o,2,k}^{sim}}{\sigma_o(i)}\right)^2 + \left(\frac{FW_{o,2,k}^{obs} - FW_{o,2,k}^{sim}}{\sigma_{fw}(i)}\right)^2\right)$$

$$F_3 = \frac{1}{2}\frac{1}{N_{time}} \sum_{k=1}^{N_{time}} \left(\left(\frac{Q_{o,3,k}^{obs} - Q_{o,3,k}^{sim}}{\sigma_o(i)}\right)^2 + \left(\frac{FW_{o,3,k}^{obs} - FW_{o,3,k}^{sim}}{\sigma_{fw}(i)}\right)^2\right)$$

$$F_4 = \frac{1}{2}\frac{1}{N_{time}} \sum_{k=1}^{N_{time}} \left(\left(\frac{Q_{o,4,k}^{obs} - Q_{o,4,k}^{sim}}{\sigma_o(i)}\right)^2 + \left(\frac{FW_{o,4,k}^{obs} - FW_{o,4,k}^{sim}}{\sigma_{fw}(i)}\right)^2\right)$$

$$F_5 = \frac{1}{2}\frac{1}{N_{time}} \sum_{k=1}^{N_{time}} \left(\frac{Q_{w,k}^{obs} - Q_{w,k}^{sim}}{\sigma_w(i)}\right)^2$$

Two independent geostatistical realizations $Z_1$ and $Z_2$ are first generated to perform history matching. The values of the global objective function and of the local objective functions are given in the table hereafter:

|  | Objective function | | | | | |
| --- | --- | --- | --- | --- | --- | --- |
|  | F | $F_1$ | $F_2$ | $F_3$ | $F_4$ | $F_5$ |
| Realization $Z_1$ | 367.4 | 102.3 | 61.5 | 22.6 | 44.5 | 136.5 |
| Realization $Z_2$ | 229.1 | 37.0 | 18.4 | 48.5 | 123.9 | 1.3 |

The global objective function of realization $Z_2$ is smaller than that of realization $Z_1$. However, for components $F_3$ and $F_4$, realization $Z_1$ is better.

1) Parametrization with a Radial Region

A radial region $R_{\lambda_3}$ is defined with a radius $\lambda_3$ around well PROD3 and a radial region $R_{\lambda_4}$ is defined with a radius $\lambda_4$ around well PROD4. The complementary region to $R_{\lambda_3}$ and $R_{\lambda_4}$ in the reservoir is denoted by $R_c = R - (R_{\lambda_3} \cup R_{\lambda_4})$. A mixed realization $Z_R(\lambda_3, \lambda_4)$ that is a function of $\lambda_3$ and $\lambda_4$ is constructed as follows:

$$Z_R(\lambda_3, \lambda_4) = Z_2(R_c) + Z_1(R_{\lambda_3}) + Z_1(R_{\lambda_4})$$

Objective function F varies as a function of $\lambda_3$ and $\lambda_4$. For $\lambda_3 = \lambda_4 = 0$, the mixed realization becomes $Z_2$, therefore the global objective function of $Z_2$ is obtained again.

Figure 6:
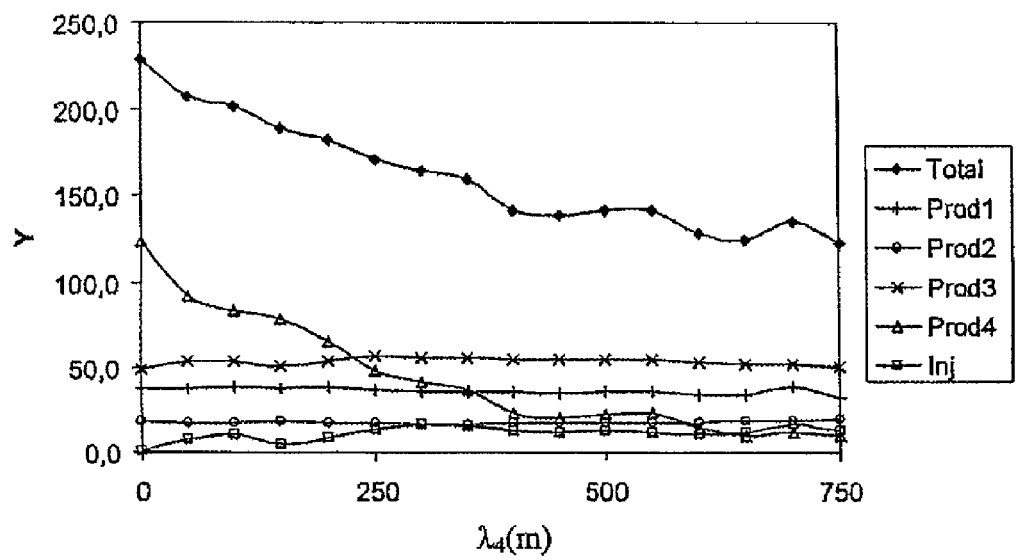
FIG. 6 shows variations of global and local objective functions as a function of parameter $\lambda_4$ in the case of a radial region.

FIG. 6 shows the variation, as a function of $\lambda_4$, of objective function F (represented by the "Total" curve) and of the local objective functions ("Prod1" for function $F_1$, "Prod2" for function $F_2$, "Prod3" for function $F_3$, "Prod4" for function $F_4$, "Inj" for function $F_5$).

Figure 7:
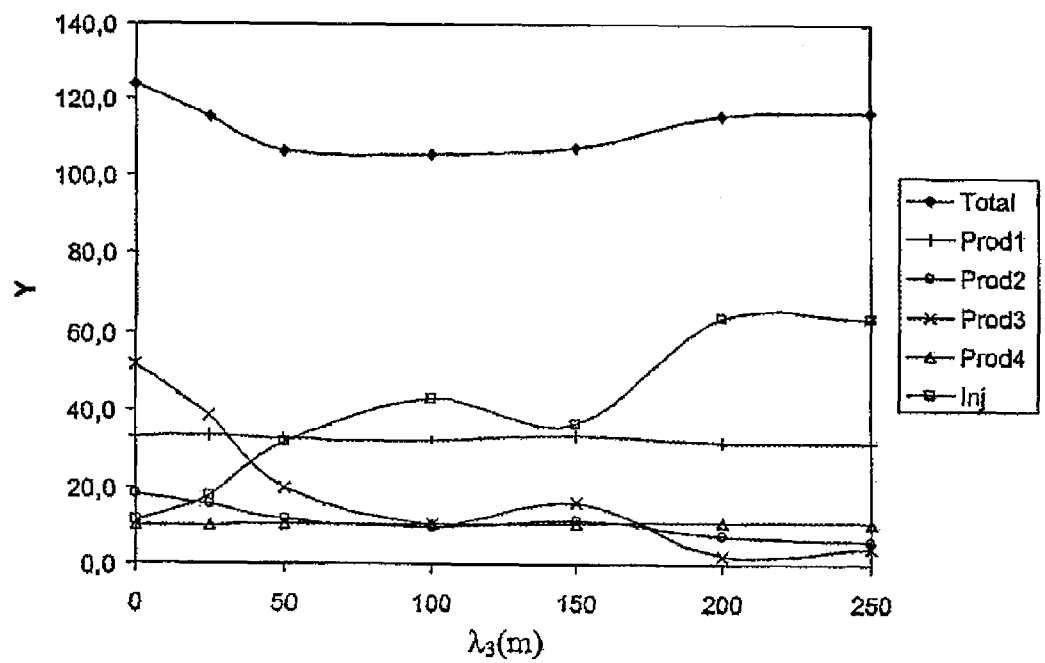
FIG. 7 shows variations of global and local objective functions as a function of parameter $\lambda_3$ for $\lambda_4=13$ fixed in the case of a radial region.

A change in parameter $\lambda_4$ significantly reduces the global objective function. The minimum value (F=124.3) is obtained around $\lambda_4 = 13$. FIG. 7 shows the variation of objective function F (represented by the "Total" curve) and of the local objective functions ("Prod1" for function $F_1$, "Prod2" for function $F_2$, "Prod3" for function $F_3$, "Prod4" for function $F_4$, "Inj" for function $F_5$) as a function of parameter $\lambda_3$ for $\lambda_4 = 13$ fixed. The global objective function can still be reduced, in particular for $\lambda_3 = 2$ (F=105.7).

Using a computer based numerical optimization technique, the minimum value of the objective function is automatically determined by a two-dimensional search.

2) Parametrization with an Elliptical Region

An elliptical type region $E_{\lambda_3}$ is defined between producer well PROD3 and the injector well with a parameter $\lambda_3$ and an elliptical type region $E_{\lambda_4}$ is defined between producer well PROD4 and the injector well with a parameter $\lambda_4$. The complementary region to $E_{\lambda_3}$ and $E_{\lambda_4}$ in the reservoir is denoted by $E_c = R - E_{\lambda_3} \cup E_{\lambda_4}$ and the mixed realization $Z(\lambda_3, \lambda_4)$ is constructed as follows:

$$Z_E(\lambda_3, \lambda_4) = Z_2(E_c) + Z_1(E_{\lambda_3}) + Z_1(E_{\lambda_4})$$

Again, for $\lambda_3 = \lambda_4 = 0$, the mixed realization becomes $Z_2$, therefore the objective function of $Z_2$ is obtained again.

Figure 8:
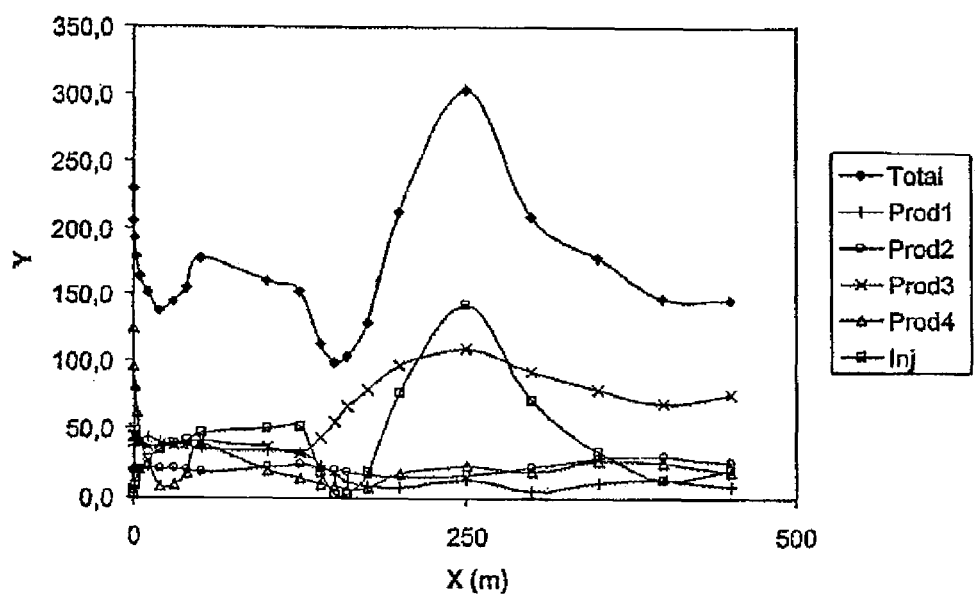
FIG. 8 shows variations of global and local objective functions as a function of parameter $\lambda_4$ in the case of an elliptical region.
Figure 9:
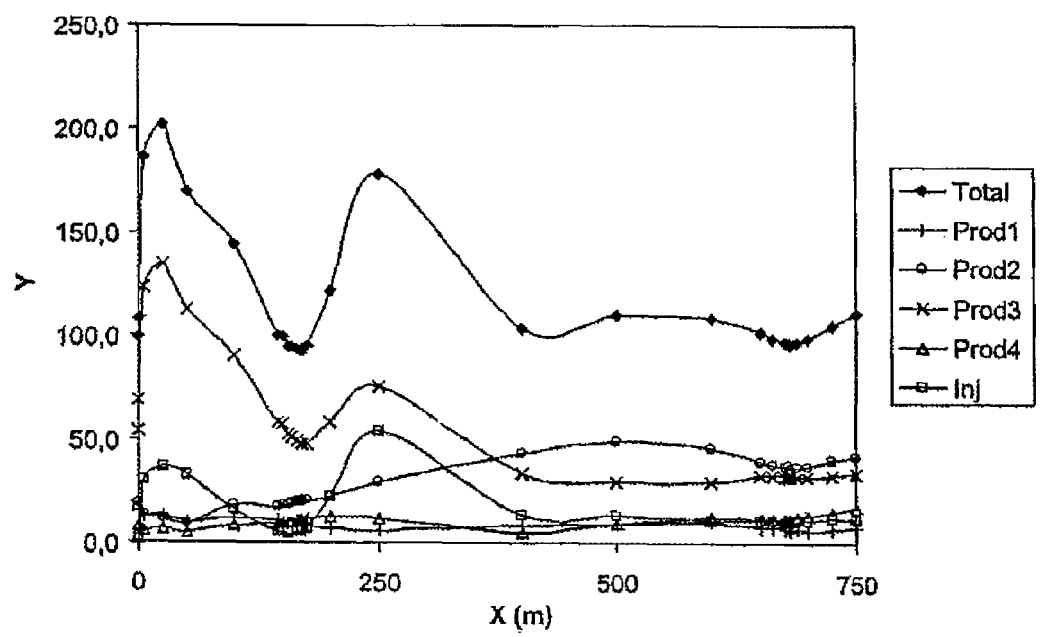
FIG. 9 shows variations of global and local objective functions as a function of parameter $\lambda_3$ for $\lambda_4=13$ fixed in the case of an elliptical region.

FIG. 8 shows the variation of objective function F (represented by the "Total" curve) and of the local functions ("Prod1" for function $F_1$, "Prod2" for function $F_2$, "Prod3" for function $F_3$, and "Prod4" for function $F_4$, "Inj" for function $F_5$) as a function of $\lambda_4$ The variation of F as a function of $\lambda_4$ is shown in FIG. 8. The best value (F=99.4) is obtained around $\lambda_4 = 3$. By fixing $\lambda_4 = 3$, the variation of F as a function of $\lambda_3$ is illustrated in FIG. 9. This figure shows the variation of objective function F (represented by the "Total" curve) and of the local functions ("Prod1" for function $F_1$, "Prod2" for function $F_2$, "Prod3" for function $F_3$, "Prod4" for function $F_4$, "Inj" for function $F_5$) as a function of parameter $\lambda_3$ for $\lambda_4 = 3$ fixed.

The minimum value (F=92.7) is obtained around $\lambda_3 = 3.38$. The defined and parametrized regions are surrounded by ellipses.

The values of the global objective function and of the local functions before calibration ($Z_2$) and after calibration ($Z_E$(3.38,3)) are given in the table hereafter:

|  | Objective function | | | | | |
| --- | --- | --- | --- | --- | --- | --- |
|  | F | $F_1$ | $F_2$ | $F_3$ | $F_4$ | $F_5$ |
| Realization $Z_2$ | 229.1 | 37.0 | 18.4 | 48.5 | 123.9 | 1.3 |
| Realization $Z_E$ (3.38, 3) | 92.7 | 9.0 | 19.4 | 48.1 | 10.8 | 5.3 |

Figure 10A:
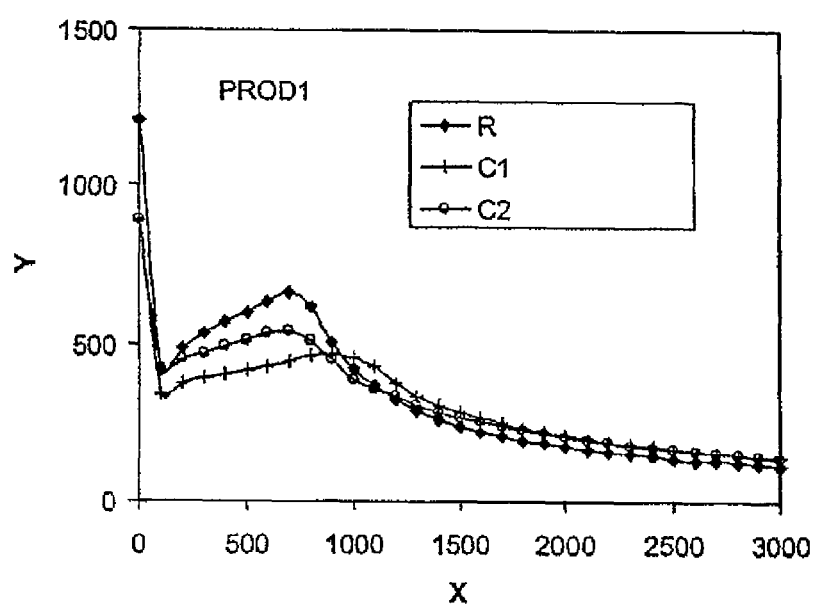
FIGS. 10A to 10E show the production and injection curves before ($Z_2$) and after ($Z_E(3.38,3)$) calibration.
Figure 10B:
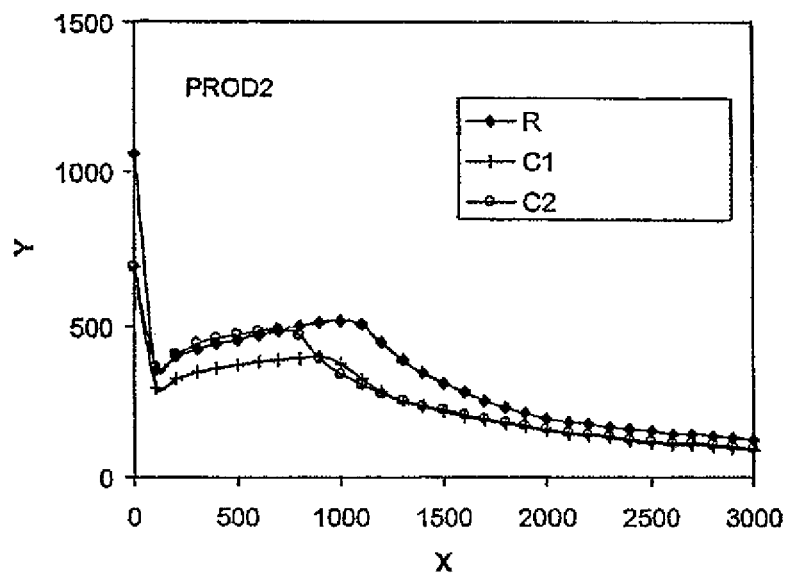
Figure 10C:
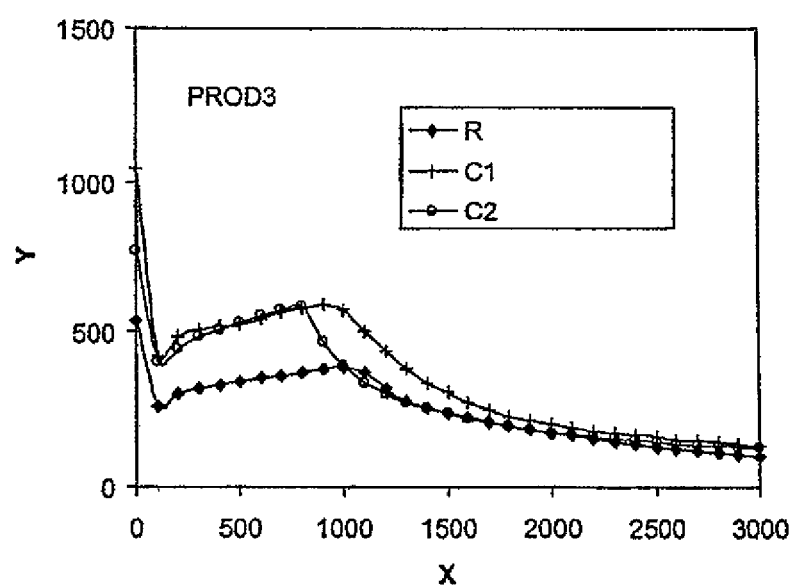
Figure 10D:
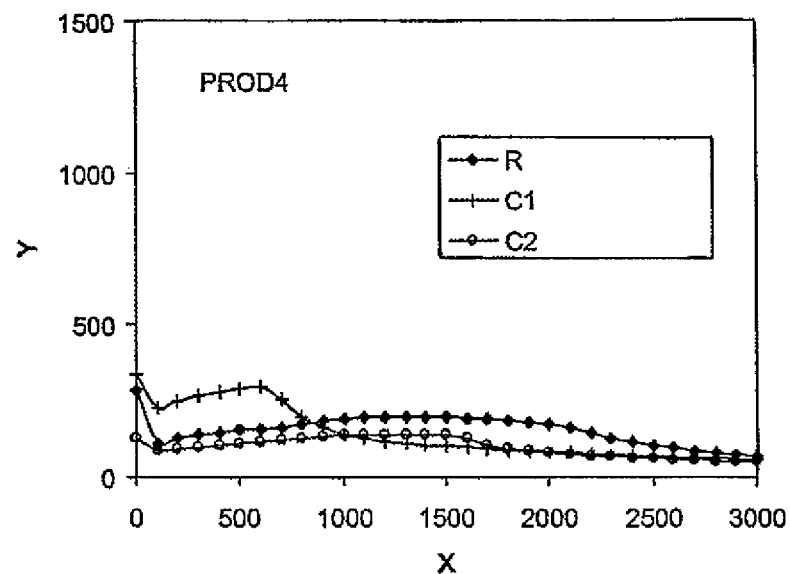
Figure 10E:
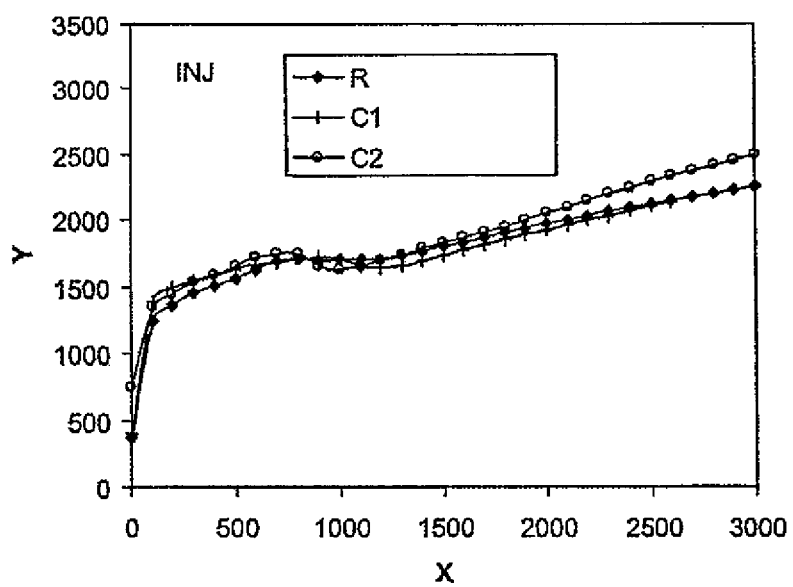

The production and injection curves before ($Z_2$) and after calibration ($Z_E$(3.38,3)) are shown in FIGS. 10A to 10E:

FIG. 10A shows the oil flow rate of producer well PROD1. Axis X is time with the unit in days. Axis Y is the flow rate with unit m³/day. Curve R is the real flow rate. Curve C1 is the simulation before calibration with realization $Z_2$ and curve C2 is the simulation after calibration with realization ($Z_E$ (3.38,3)), FIG. 10B is the oil flow rate of producer well PROD2. Axis X is time with the unit in days. Axis Y is the flow rate with unit m³/day. Curve R is the real flow rate. Curve C1 is the simulation before calibration with realization $Z_2$ and curve C2 is the simulation after calibration with realization ($Z_E$(3.38,3)), FIG. 10C is the oil flow rate of producer well PROD3. Axis X is time with the unit in days. Axis Y is the flow rate with unit m³/day. Curve R is the real flow rate. Curve C1 is the simulation before calibration with realization $Z_2$ and curve C2 is the simulation after calibration with realization ($Z_E$(3.38,3)), FIG. 10D is the oil flow rate of producer well PROD4. Axis X is time with the unit in days. Axis Y is the flow rate with unit m³/day. Curve R is the real flow rate. Curve C1 is the simulation before calibration with realization $Z_2$ and curve C2 is the simulation after calibration with realization ($Z_E$(3.38,3)), FIG. 10E is the oil flow rate of injector well INJ. Axis X is time with the unit in days. Axis Y is the flow rate with unit m³/day. Curve R is the real flow rate. Curve C1 is the simulation before calibration with realization $Z_2$ and curve C2 is the simulation after calibration with realization ($Z_E$(3.38,3)).

Figure 11A:
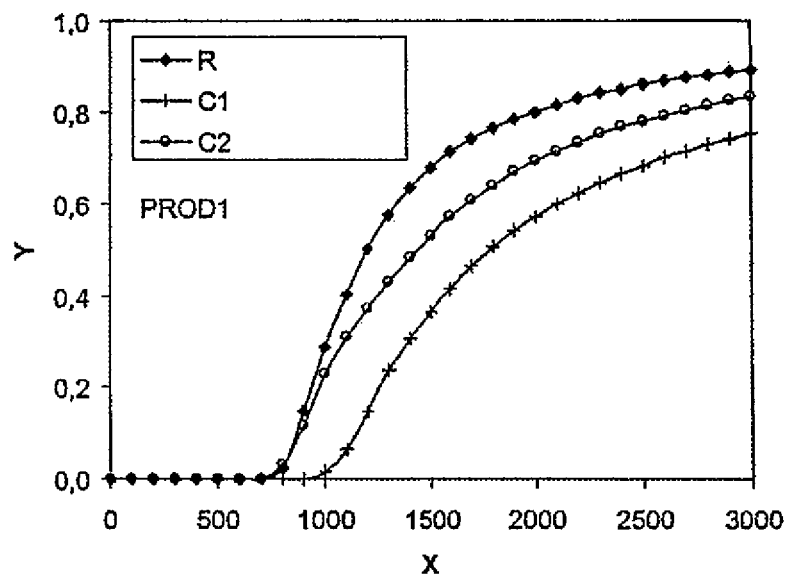
FIGS. 11A to 11D show the water cut curves in producer wells before ($Z_2$) and after ($Z_E(3.38,3)$) calibration.
Figure 11B:
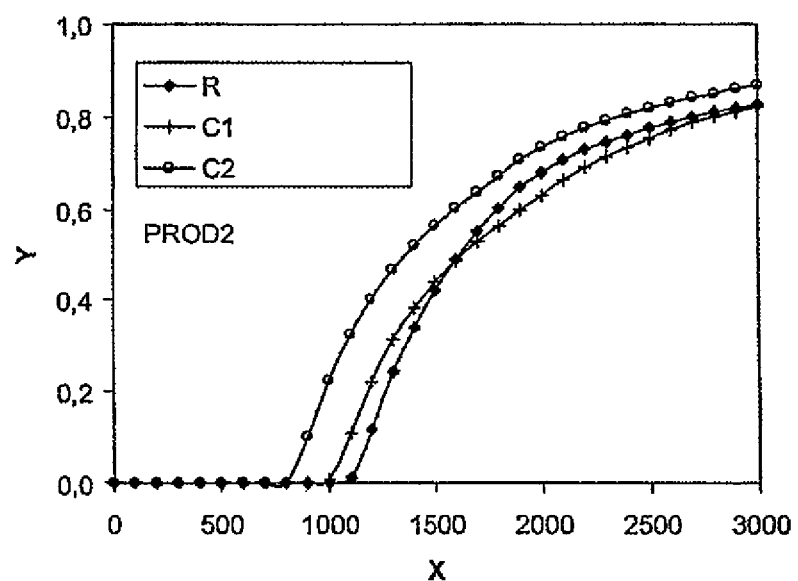
Figure 11C:
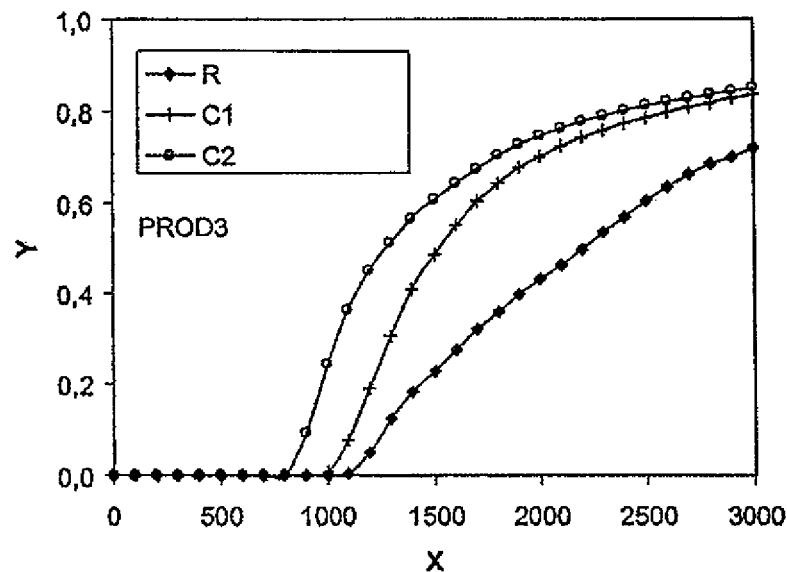
Figure 11D:
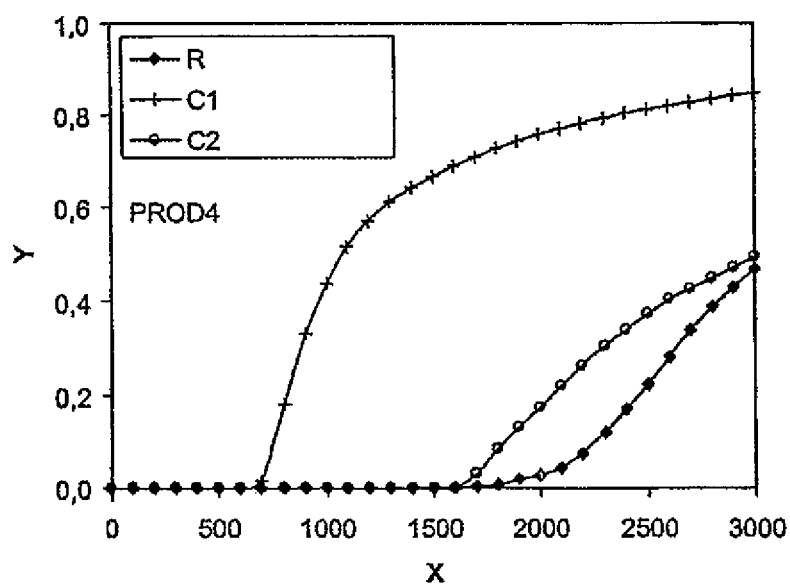

The water cut curves for the producer wells are illustrated in FIGS. 11A to 11D:

FIG. 11A shows the water cut of producer well PROD1. Axis X is time with the unit in days. Axis Y is the water cut (no unit). Curve R is the real water cut. Curve C1 is the simulation before calibration with realization $Z_2$ and curve C2 is the simulation after calibration with realization ($Z_E$(3.38,3)), FIG. 11B shows the water cut of producer well PROD2. Axis X is time with the unit in days. Axis Y is the water cut (no unit). Curve R is the real water cut. Curve C1 is the simulation before calibration with realization $Z_2$ and curve C2 is the simulation after calibration with realization ($Z_E$(3.38,3)), FIG. 11C shows the water cut of producer well PROD3. Axis X is time with the unit in days. Axis Y is the water cut (no unit). Curve R is the real water cut. Curve C1 is the simulation before calibration with realization $Z_2$ and curve C2 is the simulation after calibration with realization ($Z_E$(3.38,3)), FIG. 11D shows the water cut of producer well PROD4. Axis X is time with the unit in days. Axis Y is the water cut (no unit). Curve R is the real water cut. Curve C1 is the simulation before calibration with realization $Z_2$ and curve C2 is the simulation after calibration with realization ($Z_E$(3.38,3)).

According to this parametrization, the realizations are changed around regions $E_{\lambda,3}$ and $E_{\lambda,4}$ containing a zone around the injector well. The change in the realization around the injector well also has an impact on other producer wells, notably on producer well PROD1. In the optimum realization $Z_E(3.38,3)$), local functions $F_1$ and $F_4$ are markedly improved. Components $F_2$ and $F_3$ are nearly stable (calibration improvement for the oil flow rate, but calibration degradation for the water cut). Local function $F_5$ has not changed much because the values of this function are weak. Globally, the improvements are significant.

The invention claimed is:

1. A method of constructing an image of a petroleum reservoir, from dynamic data measured within the reservoir, comprising the steps of:
   a) generating with a computer at least two independent realizations of the reservoir from at least two Gaussian white noises;
   b) defining at least one region within the at least two independent realizations and defining a parameter allowing size and shape of the at least one region to be modified;
   c) generating a new realization of the reservoir from a linear combination of the Gaussian white noises with linear combination coefficients dependent on the parameter allowing the at least one region to be modified;
   d) calculating a local objective function measuring, within the at least one region, a difference between dynamic data simulated from the new realization and the measured dynamic data; and
   e) constructing the image of the reservoir with a computer by modifying the parameter for minimizing the local objective function and the generation of the new realization of the reservoir in accordance with step c).

2. A method as claimed in claim 1, wherein the region is of radial type and the parameter is the radius of the region.

3. A method as claimed in claim 2, wherein regions are defined within the at least two independent realizations and a parameter allowing the regions to be modified is defined for each region; and
   f) a new realization of the reservoir is generated from a linear combination of the Gaussian white noises with linear combination coefficients dependent on the parameters defined for each region;
   g) a local objective function measuring, within each region, a difference between dynamic data simulated from the new realization and the measured dynamic data is calculated for each region; and
   h) the image of the reservoir is constructed by modifying at least one of the parameters to minimize the sum of the local objective functions including by repeating stage a generated a new realization of the reservoir.

4. A method as claimed in claim 2, wherein the linear combination of Gaussian white noises is:

$$B_0(X) = \sum_{i=1}^{NR} \alpha_i B_i(X)$$

with:
X is a grid cell discretizing said reservoir;
$B_0$ is a Gaussian white noise from the linear combination, allowing the new realization to be generated;
$B_i$ is a Gaussian white noise allowing one of the independent realizations to be generated;

NR is number of Gaussian white noises to be combined;
$\alpha_i$ is coefficient of the linear combination, defined by:

$$\alpha_i = \frac{vol(X \cap R_i)}{\sqrt{\sum_{j=1}^{NR} vol^2(X \cap R_j)}}$$

with:
vol(V) being a volume of a domain V, defined from a parameter allowing the region R to be modified; and
$R_i$, $R_j$ is a region.

5. A method as claimed in claim 1, wherein the region is of elliptical type.

6. A method as claimed in claim 5, wherein regions are defined within the at least two independent realizations and a parameter allowing the regions to be modified is defined for each region; and
   f) a new realization of the reservoir is generated from a linear combination of the Gaussian white noises with linear combination coefficients dependent on the parameters defined for each region;
   g) a local objective function measuring, within each region, a difference between dynamic data simulated from the new realization and the measured dynamic data is calculated for each region; and
   h) the image of the reservoir is constructed by modifying at least one of the parameters to minimize the sum of the local objective functions including by repeating stage a generated a new realization of the reservoir.

7. A method as claimed in claim 1, wherein regions are defined within the at least two independent realizations and a parameter allowing the regions to be modified is defined for each region; and
   f) a new realization of the reservoir is generated from a linear combination of the Gaussian white noises with linear combination coefficients dependent on the parameters defined for each region;
   g) a local objective function measuring, within each region, a difference between dynamic data simulated from the new realization and the measured dynamic data is calculated for each region; and
   h) the image of the reservoir is constructed by modifying at least one of the parameters to minimize the sum of the local objective functions including by repeating stage a generated a new realization of the reservoir.

8. A method as claimed in claim 7, wherein at least one of the regions is radial.

9. A method as claimed in claim 8, wherein at least one of the regions is elliptical.

10. A method as claimed in claim 7, wherein at least one of the regions is elliptical.

11. A method as claimed in claim 7, wherein the linear combination of Gaussian white noises is:

$$B_0(X) = \sum_{i=1}^{NR} \alpha_i B_i(X)$$

with:
X is a grid cell discretizing said reservoir;
$B_0$ is a Gaussian white noise from the linear combination, allowing the new realization to be generated;
$B_i$ is a Gaussian white noise allowing one of the independent realizations to be generated;

NR is number of Gaussian white noises to be combined;
$\alpha_i$ is coefficient of the linear combination, defined by:

$$\alpha_i = \frac{vol(X \cap R_i)}{\sqrt{\sum_{j=1}^{NR} vol^2(X \cap R_j)}}$$

with:
vol(V) being a volume of a domain V, defined from a parameter allowing the region R to be modified; and
$R_i$, $R_j$ is a region.

12. A method as claimed in claim 1, wherein the linear combination of Gaussian white noises is:

$$B_0(X) = \sum_{i=1}^{NR} \alpha_i B_i(X)$$

with:
X is a grid cell discretizing said reservoir;
$B_0$ is a Gaussian white noise from the linear combination, allowing the new realization to be generated;
$B_i$ is a Gaussian white noise allowing one of the independent realizations to be generated;
NR is number of Gaussian white noises to be combined;
$\alpha_i$ is coefficient of the linear combination, defined by:

$$\alpha_i = \frac{vol(X \cap R_i)}{\sqrt{\sum_{j=1}^{NR} vol^2(X \cap R_j)}}$$

with:
vol(V) being a volume of a domain V, defined from a parameter allowing the region R to be modified; and
$R_i$, $R_j$ is a region.

13. A method as claimed in claim 1, wherein the at least one region corresponds to a zone around a well drilled through the reservoir.

14. A method as claimed in claim 1, wherein the at least one region corresponds to a zone between two wells drilled through the reservoir.

15. A method as claimed in claim 1, wherein the at least one region corresponds to a zone having homogeneous characteristics identified on seismic data.

* * * * *